US012659495B2

(12) United States Patent (10) Patent No.: US 12,659,495 B2
Sim et al. (45) Date of Patent: Jun. 16, 2026

(54) METHOD AND APPARATUS FOR VIDEO CODING USING SEGMENTATION

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Jun Taek Park, Seoul (KR); Han Sol Choi, Dongducheon-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 25 days.

(21) Appl. No.: 18/367,871

(22) Filed: Sep. 13, 2023

(65) Prior Publication Data

US 2024/0007656 A1 Jan. 4, 2024

Related U.S. Application Data

(63) Continuation of application No. PCT/KR2022/004431, filed on Mar. 29, 2022.

(30) Foreign Application Priority Data

Apr. 2, 2021 (KR) ........................ 10-2021-0043577
Mar. 28, 2022 (KR) ........................ 10-2022-0038236

(51) Int. Cl.
*H04N 19/20* (2014.01)
*H04N 19/17* (2014.01)
*H04N 19/423* (2014.01)

(52) U.S. Cl.
CPC ............. *H04N 19/20* (2014.11); *H04N 19/17* (2014.11); *H04N 19/423* (2014.11)

(58) Field of Classification Search
CPC .... H04N 19/11; H04N 19/119; H04N 19/124; H04N 19/17; H04N 19/184; H04N 19/20;
(Continued)

(56) References Cited

U.S. PATENT DOCUMENTS 8,922,717 B2 12/2014 Eleftheriadis et al.
9,584,814 B2 2/2017 Socek et al.
(Continued)

FOREIGN PATENT DOCUMENTS

KR 20180003304 A 1/2018
KR 101894649 B1 10/2018
KR 20190017286 A 2/2019

OTHER PUBLICATIONS

International Search Report and Written Opinion cited in corresponding PCT application No. PCT/KR2022/004431; Jul. 6, 2022; 9 pp.

*Primary Examiner* — Shahan Ur Rahaman
(74) *Attorney, Agent, or Firm* — Lempia Summerfield Katz LLC

(57) ABSTRACT

A method and an apparatus for video coding using segmentation are disclosed. The video coding method and the apparatus segment a current picture to generate objects. The method and apparatus also manage information related to a memory, a filter, and a quantization parameter for each of the objects to enhance encoding efficiency in encoding or decoding of the objects existing in the current picture.

14 Claims, 23 Drawing Sheets

(58) Field of Classification Search
CPC ...... H04N 19/423; H04N 19/44; H04N 19/46;
H04N 19/593; H04N 19/70; H04N 19/82
See application file for complete search history.

(56) References Cited

U.S. PATENT DOCUMENTS

| | | | |
|---|---|---|---|
| 10,225,560 B2 | 3/2019 | Yoshikawa et al. | |
| 10,949,675 B2 | 3/2021 | Park et al. | |
| 2002/0010938 A1* | 1/2002 | Zhang | H04L 47/762 |
| | | | 375/E7.005 |
| 2012/0170649 A1* | 7/2012 | Chen | H04N 19/122 |
| | | | 375/240.18 |
| 2015/0095040 A1 | 4/2015 | Eleftheriadis et al. | |
| 2015/0334398 A1* | 11/2015 | Socek | H04N 19/182 |
| | | | 375/240.26 |
| 2016/0219281 A1 | 7/2016 | Yoshikawa et al. | |
| 2017/0069350 A1* | 3/2017 | Eleftheriadis | H04N 21/426 |
| 2019/0222852 A1 | 7/2019 | Yoshikawa et al. | |
| 2019/0251364 A1 | 8/2019 | Park et al. | |
| 2019/0364259 A1* | 11/2019 | Chen | H04N 21/23412 |
| 2021/0006833 A1* | 1/2021 | Tourapis | G06T 7/10 |
| 2021/0275908 A1* | 9/2021 | Amer | G06T 7/215 |
| 2023/0401785 A1* | 12/2023 | Ramirez Solorzano | |
| | | | H04N 21/23412 |

* cited by examiner

Input picture

Object bitstream

Illustration of segmentation map

Illustration 1 of object

Illustration 2 of object

POC 0

POC 1

POC 2

POC 3

POC 4

| POC 0 / Obj idx 0 | POC 1 / Obj idx 0 | . . . |
|---|---|---|

DOB 0

| POC 0 / Obj idx 1 | POC 1 / Obj idx 1 | . . . |
|---|---|---|

DOB 1

| POC 0 / Obj idx 2 | POC 1 / Obj idx 2 | . . . |
|---|---|---|

DOB 2

FIG. 12A

DOB 0        DOB 1        DOB 2

DOB 0        DOB 1        DOB 2

FIG. 17

Object 0    Object 1    Area C    Area B    Object 2

Area A

☐    Overlapping area between non−background objects

―――    Blending boundary

⧄    Area filled with values of Object 1

⧅    Area filled with values of Object 2

—— Boundary between objects

—— Boundary where pixels on both sides are contained in the same object

—— Blending boundary

METHOD AND APPARATUS FOR VIDEO CODING USING SEGMENTATION

CROSS-REFERENCE TO RELATED APPLICATIONS

This application is a Continuation of International Application No. PCT/KR2022/004431 filed on Mar. 29, 2022, which claims priority to Korean Patent Application No. 10-2021-0043577 filed on Apr. 2, 2021, and Korean Patent Application No. 10-2022-0038236 filed on Mar. 28, 2022, the entire disclosures of each of which are incorporated herein by reference.

TECHNICAL FIELD

The present disclosure relates to a video encoding method and an apparatus using segmentation.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Meanwhile, when one picture includes a plurality of objects, the encoder may generate a bitstream for each object after encoding an object-based image rather than encoding a block-based image conventionally. Alternatively, as in the existing video coding method, a bitstream may be generated per picture basis for pictures including objects. In this case, the encoder may extract a plurality of objects from the input image using segmentation. The decoder may perform object-based decoding based on the bitstream. In conventional block-based encoding, encoding information is managed in high levels including blocks and per block basis. Therefore, it may need to consider a method for managing encoding information for each object for object-based video.

SUMMARY

The present disclosure seeks to provide a video coding method and an apparatus for segmenting a current picture to generate objects and then managing information related to a memory, a filter, and a quantization parameter for each of the objects to enhance coding efficiency in encoding or decoding of the objects existing in the current picture.

At least one aspect of the present disclosure provides a method for decoding objects performed by a video decoding apparatus. The method comprises decoding headers of the objects and a segmentation map from a bitstream. The header of each of the objects includes an index of each of the objects and information on an area of each of the objects. The method also comprises deriving an area of each of the objects by using the segmentation map, the index, and the information on the area of each of the objects. The method also comprises generating a restored object by decoding each of the objects from the bitstream based on the area. The method also comprises storing restored objects corresponding to the objects in at least one decoded object buffer (DOB). Each DOB includes a DOB header The method also comprises reconstituting a restored picture by combining the restored objects, and then storing the restored picture in a decoded picture buffer (DPB).

Another aspect of the present disclosure provides a video decoding apparatus. The apparatus includes an entropy decoder configured to decode headers of objects and a segmentation map from a bitstream. The header of each of the object includes an index of each of the objects and information on an area of each of the objects. The apparatus also includes an object decoder configured to derive the area of each of the objects using the segmentation map, the index, and the information on the area of each of the objects. The object decoder is also configured to decode each of the objects from the bitstream based on the area to generate a restored object. The apparatus also includes at least one decoded object buffer (DOB) configured to store restored objects corresponding to the objects. Each DOB includes a DOB header. The apparatus also includes a decoded picture buffer (DPB) configured to reconstitute a restored picture by combining the restored objects and store the restored picture.

Yet another aspect of the present disclosure provides a method for encoding objects performed by a video encoding apparatus. The method comprises obtaining headers of objects and a segmentation map from a high level. The header of each of the objects includes an index of each of the objects and information on an area of each of the objects. The method also comprises deriving an area of each of the objects by using the segmentation map, the index, and the information on the area of each of the objects. The method also comprises encoding each of the objects based on the area and generating a restored object by decoding each of the encoded objects. The method also comprises storing restored objects corresponding to the objects in at least one decoded object buffer (DOB). Each DOB includes a DOB header. The method also comprises reconstituting a restored picture by combining the restored objects. The method also comprises storing the restored picture in a decoded picture buffer (DPB).

As described above, the present disclosure provides a video coding method and an apparatus for segmenting a current picture to generate objects in encoding or decoding of the objects existing in the current picture. The video coding method and the apparatus manage information related to a memory, a filter, and a quantization parameter for each of the objects to improve coding efficiency.

BRIEF DESCRIPTION OF THE DRAWINGS

FIGS. 12A and 12B are diagrams illustrating DOBs in which objects are stored according to another embodiment of the present disclosure.

FIG. 17 is a diagram illustrating a storage order of pixels in an object according to an embodiment of the present disclosure.

DETAILED DESCRIPTION

Figure 1:
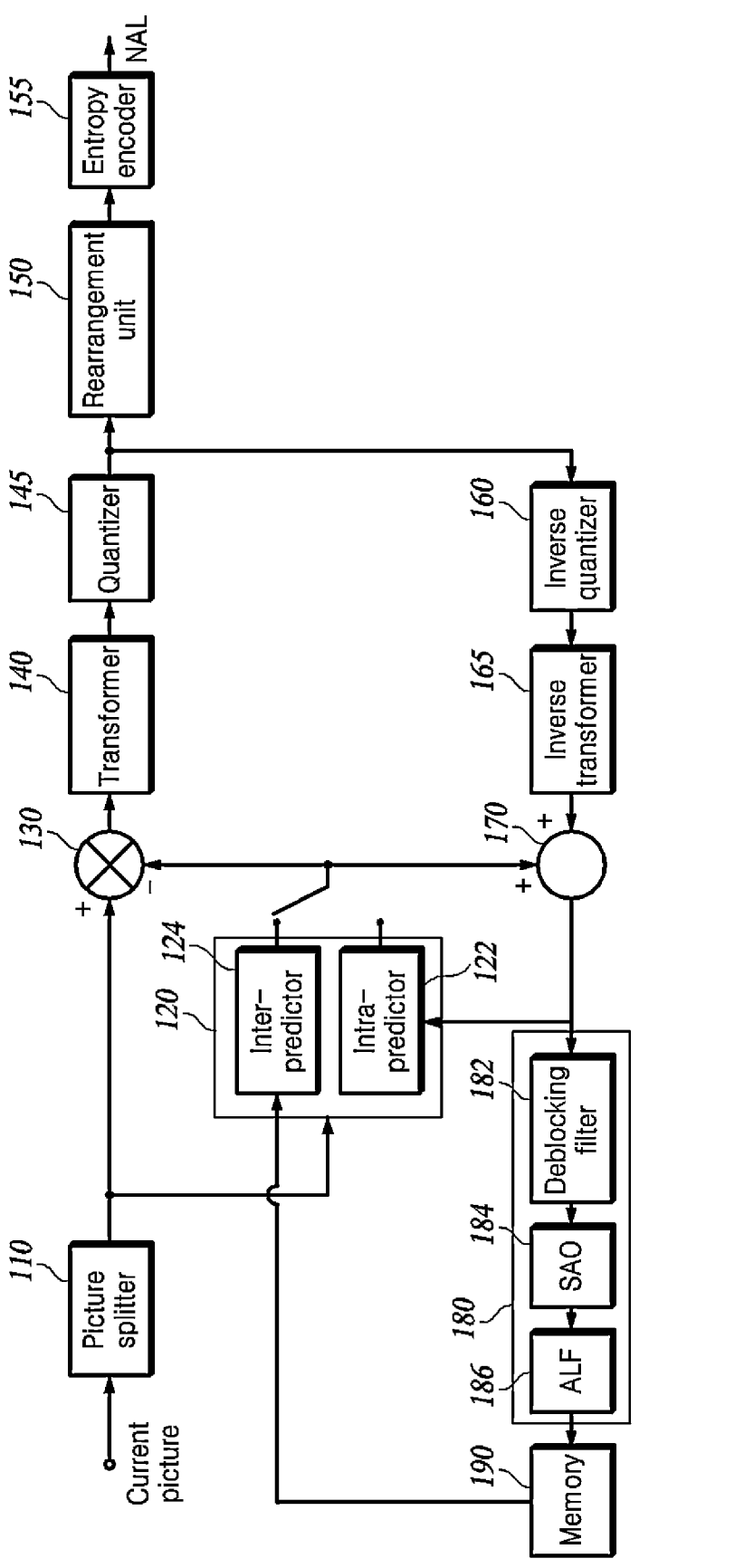
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions where considered to obscure the subject of the present disclosure have been omitted for the purpose of clarity and for brevity.

FIG. 1 is a block diagram of a video encoding apparatus that may implement technologies of the present disclosure.

Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
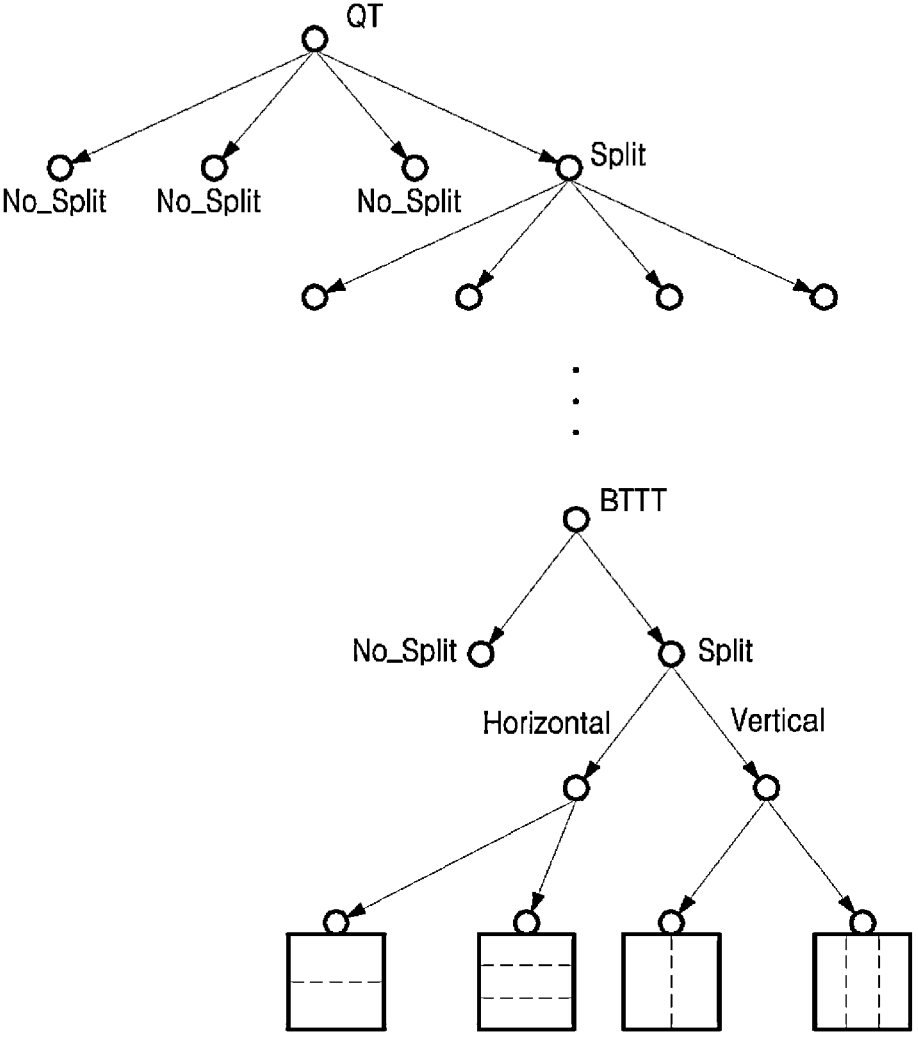
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
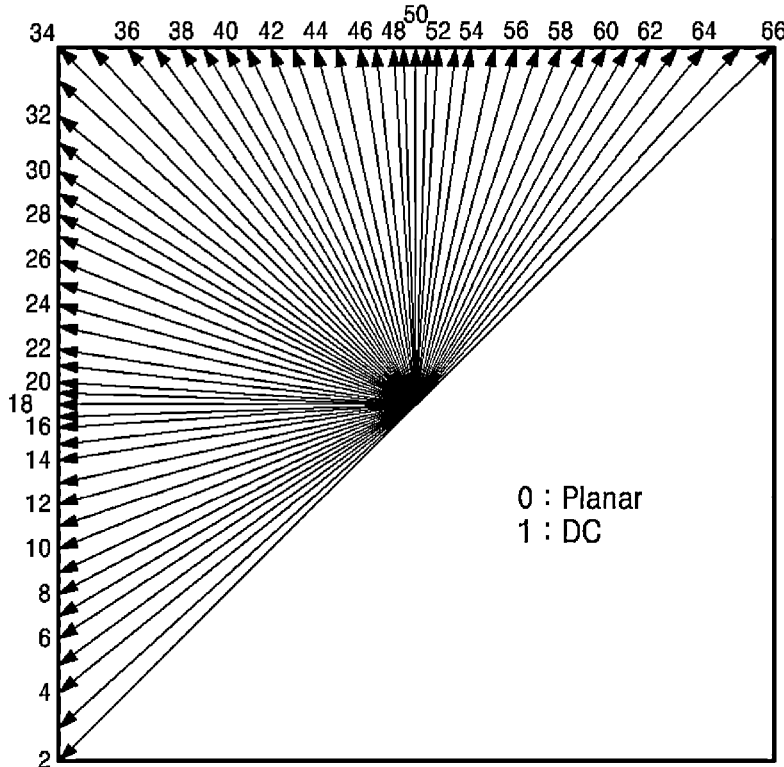
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
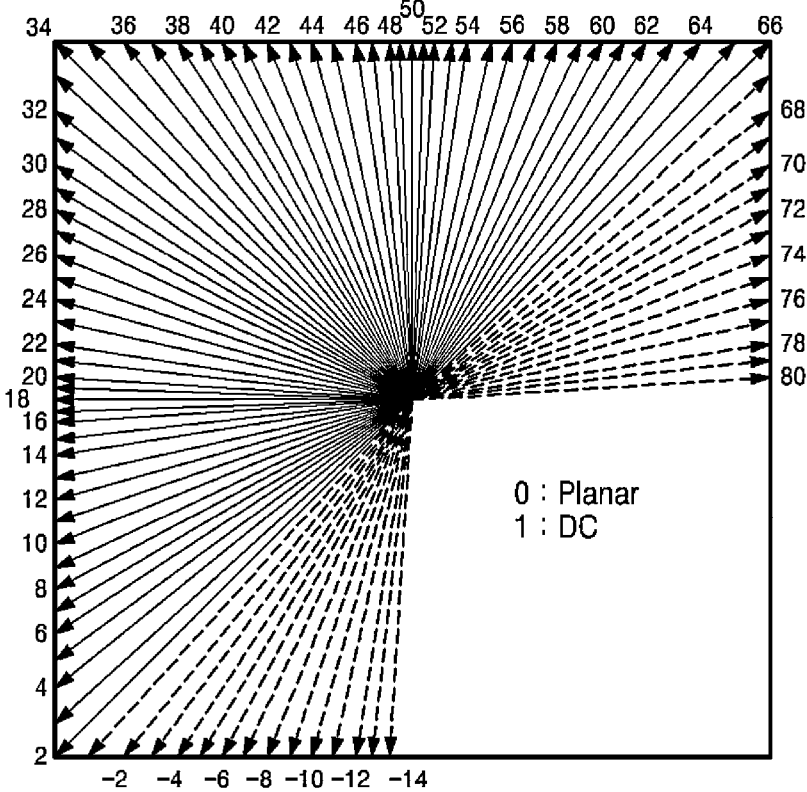

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
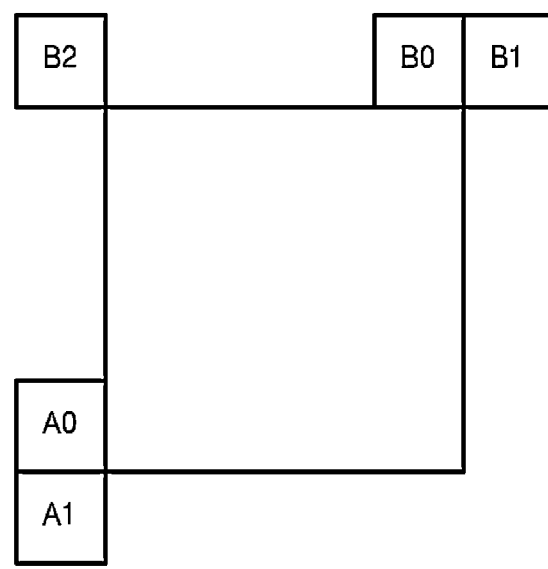
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
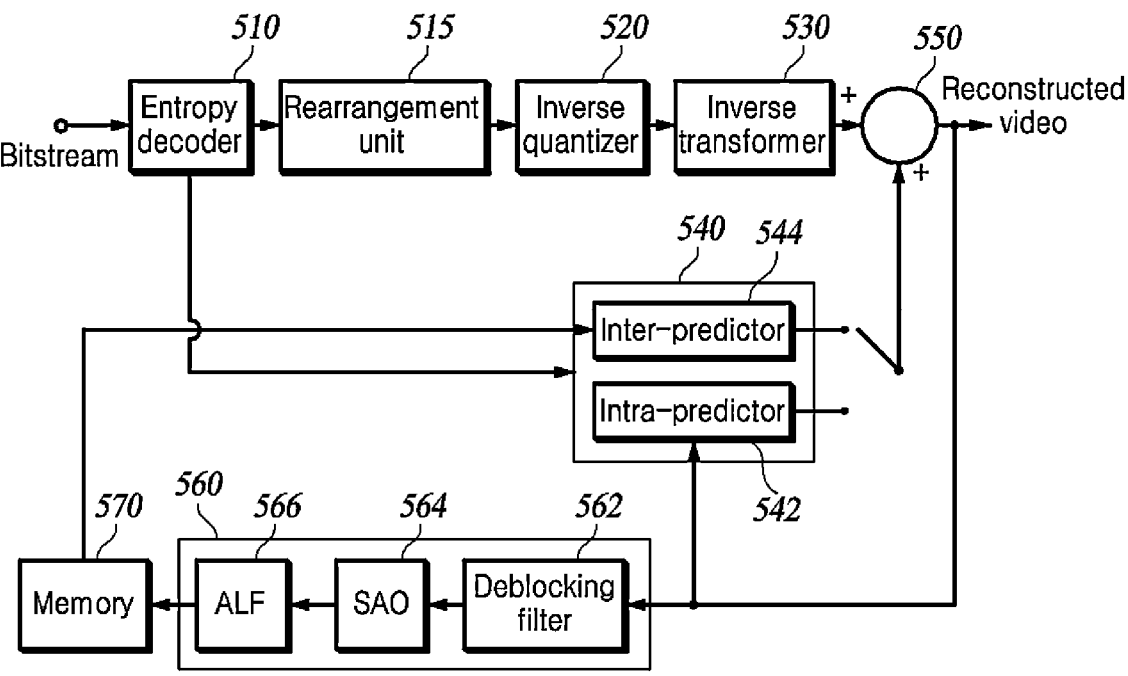
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

For example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for segmenting a current picture to generate objects and managing information related to a memory, a filter, and a quantization parameter for each of the objects in encoding or decoding of the objects existing in the current picture.

Hereinafter, a specific flag of true indicates that a value of the corresponding flag is 1, and the specific flag of false indicates that the value of the corresponding flag is 0.

Figure 6:
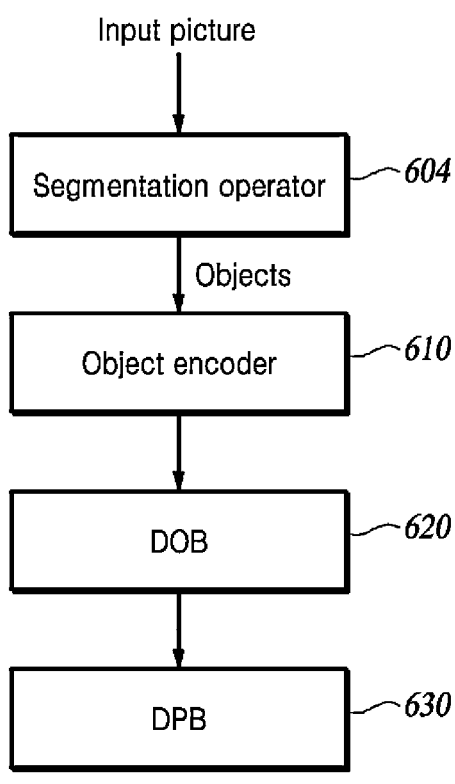
FIG. 6 is a block diagram conceptually illustrating an object-based video encoding apparatus according to an embodiment of the present disclosure.

FIG. 6 is a block diagram conceptually illustrating an object-based video encoding apparatus according to an embodiment of the present disclosure.

A video encoding apparatus extracts objects from an input picture, generates a segmentation map, and then encodes them. The video encoding apparatus includes all or some of a segmentation operator 604, an object encoder 610, a decoded object buffer (DOB) 620, and a decoded picture buffer (DPB) 630.

The segmentation operator 604 performs segmentation on an input picture to split the input picture into different objects and generates segmentation information for the objects. The segmentation operator 604 may output, as segmentation information, a map to which an index corresponding to each object is assigned per pixel basis. The segmentation operator 604 may perform segmentation based on an image boundary detection method, an area separation method, a clustering method, and the like. Alternatively, segmentation may be performed based on a network including single or multiple convolutional layers.

The object encoder 610 encodes the segmentation map and objects to generate a bitstream. The generated bitstream is delivered to the video decoding apparatus. The objects may be encoded by an existing block-based encoding apparatus as illustrated in FIG. 1. Also, the video encoding apparatus may signal the presence or absence of an object to the video decoding apparatus. When there are objects, the video encoding apparatus may signal the number and indices of the objects to the video decoding apparatus.

Meanwhile, the object encoder 610 may generate restored objects by including components for decoding objects, similarly to the video encoding apparatus illustrated in FIG. 1.

The DOB 620 stores the restored objects. The restored objects may be used as reference objects later.

The DPB 630 stores a restored picture generated by combining the restored objects. The restored picture may be used as a reference picture later.

Figure 7:
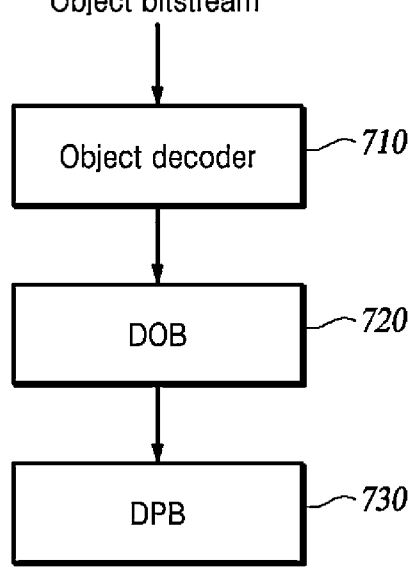
FIG. 7 is a block diagram conceptually illustrating an object-based video decoding apparatus according to an embodiment of the present disclosure.

FIG. 7 is a block diagram conceptually illustrating an object-based video decoding apparatus according to an embodiment of the present disclosure.

A video decoding apparatus decodes objects from a bitstream and combines the objects to generate a restored picture. The video decoding apparatus includes all or some of an object decoder 710, a DOB 720, and a DPB 730.

The object decoder 710 generates restored objects by parsing the bitstream and decoding the objects. In this case, the bitstream may be parsed by the entropy decoder 510. Also, the restored objects may be generated by an existing block-based decoding apparatus as illustrated in FIG. 5.

The DOB 720 stores the restored objects. The restored objects may be used as reference objects later.

The DPB 730 stores a restored picture generated by combining the restored objects. The restored picture may be used as a reference picture later.

Hereinafter, the implementations are described with respect to the decoding of objects by the video decoding apparatus. Meanwhile, for convenience of description, if necessary, a video encoding apparatus is referred. Nevertheless, most of the embodiments described below may be equally or similarly applied to a video encoding apparatus. Meanwhile, the video encoding apparatus determines information related to encoding of objects (flags and indices to be described later) in terms of optimizing rate distortion. Thereafter, the video encoding apparatus may encode the information to generate a bitstream and then may signal the bitstream to the video decoding apparatus. Also, the video encoding apparatus may obtain information related to encoding of objects from a high level, and then encode the current object.

Meanwhile, a picture may be split into subpictures, slices, tiles, object units (hereinafter referred to as 'objects'), CTUs, CUs, and the like. The video decoding apparatus may parse the presence or absence of an object in a parameter set per picture or slice basis. When an object exists, the video decoding apparatus may parse the number and indices of transmitted objects.

As described above, functions, such as prediction, independent encoding/decoding, transmission, and memory storage, as illustrated in FIG. 1 or FIG. 5, may be applied to the object. Objects may overlap each other. Each object may include an object header. The header includes all or some of the index of the object, the type of the object, information on the area of the object, a basic quantization parameter, a basic motion parameter, whether to perform in-loop filtering at the boundary, or whether to reference different objects. The information on the area of the object included in the object header may indicate the shape (arbitrary shape or rectangular shape) of each object.

Figure 8A:
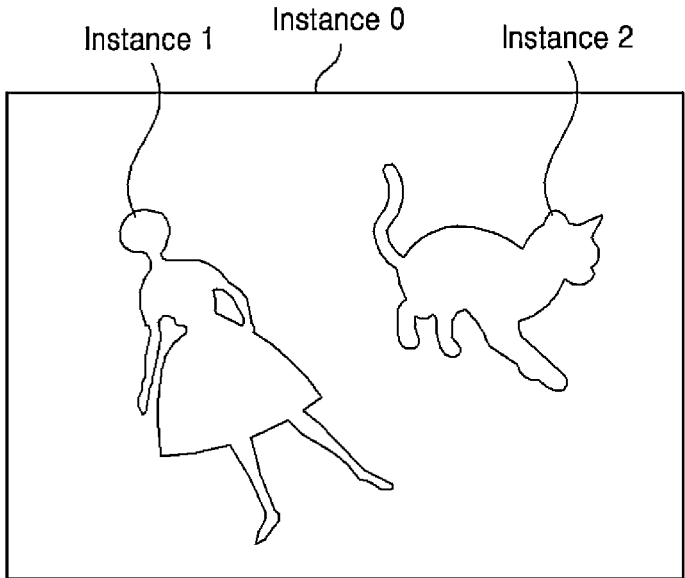
FIGS. 8A and 8B are diagrams illustrating a segmentation map and objects according to an embodiment of the present disclosure.
Figure 8B:
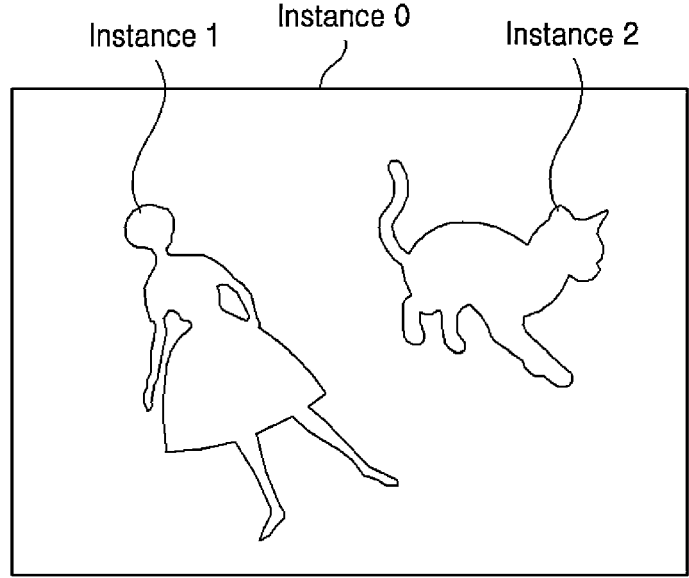
Figure 8B:
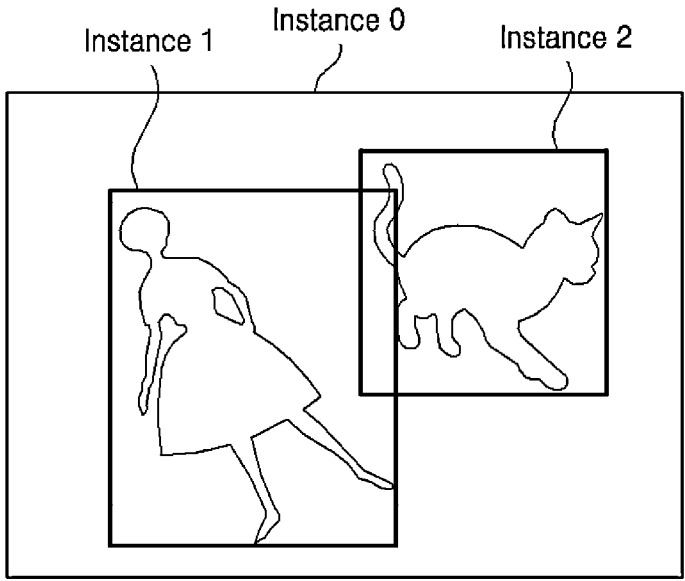

When the area of the object has an arbitrary shape, the area of the object may be derived using the segmentation map transmitted by the video encoding apparatus. The segmentation map may be an instance index map per pixel basis as illustrated in FIG. 8A when a picture is split into one or multiple instances. As illustrated in FIG. 8B, the object may be a set of pixels having the same instance index in the segmentation map.

Alternatively, the object area may have a rectangular shape including an area of an arbitrary shape. When the area of the object has a rectangular shape, information on the area of the object may indicate the position and size of the rectangle in the picture. As another example, according to a predetermined rule, the video encoding apparatus and the video decoding apparatus may generate a rectangular area including an arbitrary shape as the object area.

The following techniques for prediction, quantization parameter (QP), DOB management, DPB management, in-loop filtering, and the like may be applied regardless of the shape of the object area.

Hereinafter, object prediction is described.

When an object exists in the current picture and is a rectangular area, the video encoding apparatus may split the object into coding blocks starting from the top left coordinate of the object. Here, each coding block may be a CTU or CU. Thereafter, the video encoding apparatus may split each coding block into prediction units and may perform prediction for each prediction unit. When an object exists in the current picture and the object is a non-rectangular area having an arbitrary shape, the object itself may be used as a prediction unit.

On the other hand, when no object exists in the current picture or slice, the video encoding apparatus may split the picture or slice into coding blocks starting from the top left coordinate of the picture or slice according to the existing block-based coding method. Thereafter, the video encoding apparatus may split each coding block into prediction units and may perform prediction for each prediction unit.

The video encoding apparatus and the video decoding apparatus proceed with encoding/decoding of each object. In this case, the bitstream may include object-based bitstreams. Alternatively, as in the existing video coding method, the bitstream may be a bitstream generated per picture basis.

The video encoding apparatus and the video decoding apparatus may indicate whether encoding/decoding is performed in object units using high level syntax. When encoding/decoding is performed in object units, segmentation information of the current picture may be encoded/decoded. In this case, the segmentation information includes the number of objects in the current picture and the type, size, and position of each object. In addition, types of techniques usable for prediction, transformation, quantization, and entropy coding may be encoded/decoded according to information stored in each object header as described above. Here, prediction, transformation, quantization, and entropy coding techniques based on existing video coding methods may be used as those techniques. Also, information for fixing or limiting the position of the reference samples may be encoded/decoded.

In addition to the above data, the object header information may further include all or some of the types of prediction methods (inter prediction, intra prediction) that can be used, the types and number of transformation methods (types of transformation filters) that can be used, the types and number of prediction modes (directional mode of intra prediction or inter prediction mode), size of DPB 630, 730, subpixel precision, range and position of samples that can be used as reference samples, type/coefficient/precision of filter, the order of in-loop filters, the order of transformation, the quantization parameter, and/or the importance of the object. Here, the importance may be generated for each object in the process of performing segmentation on the input picture.

The video decoding apparatus and the video encoding apparatus may use only the prediction method for a background object and may use the intra prediction and the inter prediction for a human object, so that only a fixed method may be used according to the object type and importance. Alternatively, according to the type and importance of an object, the number of prediction modes that can be used in intra prediction may be limited, or the type of inter prediction mode or the range of a motion vector may be limited. Alternatively, when generating reference samples for intra prediction of the current object, only samples existing in the current object may be used in order to limit the range and position of usable reference samples.

Depending on the encoded/decoded object header information, the video encoding apparatus and the video decoding apparatus may change and omit the order of processes such as, prediction, transformation, and quantization, or the video encoding apparatus and the video decoding apparatus may turn on/off each of dedicated tools required for encoding/decoding of the corresponding object when performing the process.

In addition, instead of encoding/decoding pixel values of an object, the video encoding apparatus and the video decoding apparatus may derive objects using synthesis. In the case of deriving an object through synthesis, the object header information may include whether or not to synthesize and may include object description information for synthesis. For example, when an object is repeated in a specific pattern, such as a lawn, a cloudless sky, a lake, or the exterior of a building, and thus the type of object is of low importance in the image or does not correspond to the region of interest (ROI) (positioned far from the ROI area), the video encoding apparatus and the video decoding apparatus may encode/decode the description information of the corresponding object and the corresponding pattern and may then synthesize the object using the corresponding pattern. The description information of the object may include information, such as the type of color included in the pattern, the size of the pattern, the type of pattern, and the shape of the pattern. In this case, the video encoding apparatus may encode a corresponding index value from a list including information on preset patterns and may transmit the encoded index value to the video decoding apparatus. Hereinafter, the QP of an object is described.

When encoding/decoding is performed for each object, information related to a QP required for encoding/decoding may be encoded/decoded. In addition, the object may be split into N arbitrary sub-objects including one or more pixels, and QP information may be encoded/decoded per each sub-object basis. In addition, a difference (delta) QP value may be additionally encoded/decoded for each sub-object of the object. The difference QP may be encoded/decoded for each component constituting an object. Alternatively, after selecting one from a list of difference QP values preset between the video encoding apparatus and the video decoding apparatus, the corresponding index value may be encoded/decoded. In this case, a difference QP may be encoded/decoded for each component of the object, or the same difference QP value may be shared by one or more components.

For example, in the case of a sub-object having a high probability of being adjacent to another object, an initial QP may be set high, and a difference QP value of the sub-object may be determined according to the complexity of the object. In the case of an object with low complexity, the compression rate may be increased by setting the difference QP value so that the sub-object uses a high QP value. On the other hand, in the case of an object with high complexity, degradation may occur less by setting the difference QP value so that the sub-object uses a low QP value.

Hereinafter, a method for encoding/decoding QP-related syntax information in the case of managing QPs for each object is described with reference to the illustration of FIG. 9.

Figure 9:
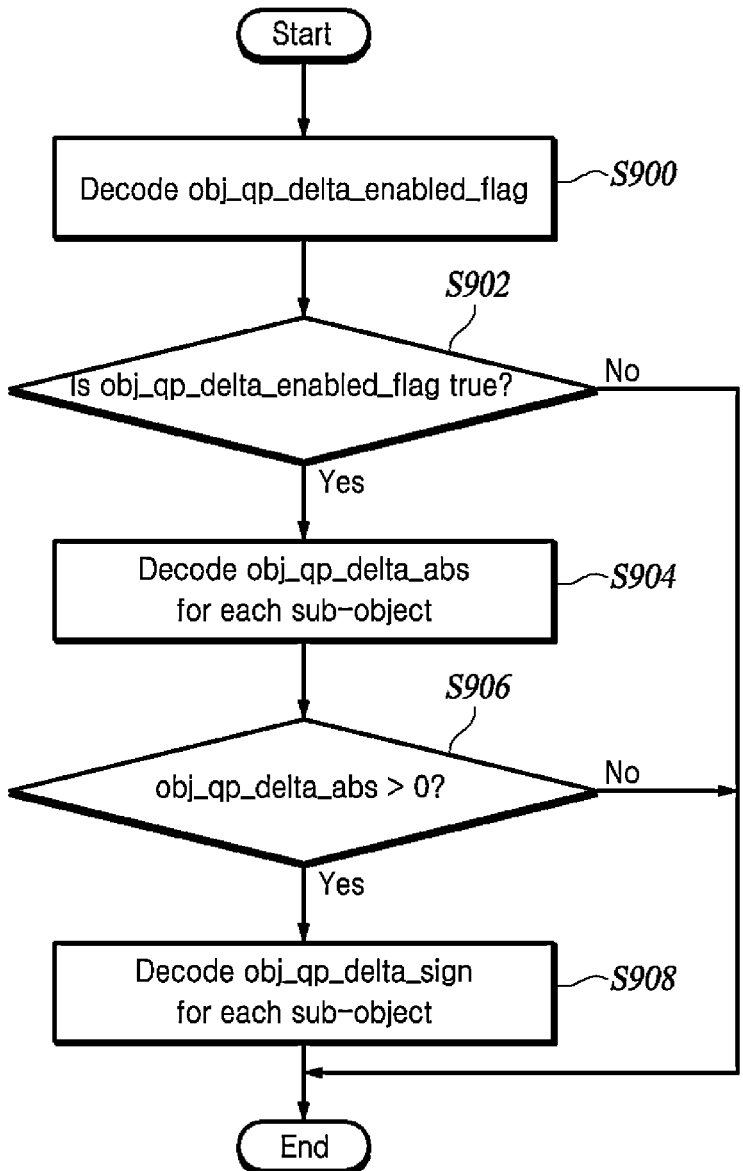
FIG. 9 is a flowchart illustrating a method for decoding Quantization Parameter (QP)-related syntax information according to an embodiment of the present disclosure.

FIG. 9 is a flowchart illustrating a method for decoding QP-related syntax information according to an embodiment of the present disclosure.

The video decoding apparatus decodes the flag obj_qp_delta_enabled_flag indicating whether to activate the use of difference QP for objects from the bitstream (S900), and then checks the corresponding flag (S902).

When the corresponding flag is activated (Yes in S902), the video decoding apparatus decodes the absolute value of the difference QP for each sub-object of each object (S904) and then determines whether the absolute value of the difference QP is greater than 0 (S906).

When the absolute value of the difference QP for each sub-object is greater than 0 (Yes in S906), the video decoding apparatus may decode the sign of the difference QP (S908) to finally derive the difference QP value.

The illustration in FIG. 9 may also be applied to the video encoding apparatus. In this case, the video encoding apparatus obtains information on the corresponding flag and difference QP from a high level and encodes the obtained information. In addition, in the illustration of FIG. 9, the execution order of each level may be changed, omitted, or added, and the level at which each syntax is transmitted may be changed.

After generating the difference QP of each sub-object, the video encoding apparatus and the video decoding apparatus may additionally adjust the QP value of the encoding/decoding basic unit (i.e., block) using the difference QP value.

Hereinafter, the management of DOBs 620 and 720 related to objects is described. Hereinafter, DOBs 620 and 720 are expressed as DOB.

In the DOB, one or multiple objects in the same frame or different frames may be sequentially stored. The DOB includes a header. The DOB header may include all or some of the number of objects stored in the DOB, the picture order count (POC) of the frame including each object, the index of each object in the frame, the position of each object in the frame, the number of pixels of each object, and/or the scale of each object. Here, the scale indicates a degree of change in resolution when a down-sampled or up-sampled object is stored. There may not be a case in which POC values of multiple objects and index values of objects are all the same within one DOB. In addition, multiple objects with different POCs and the same index may not be the same instance (unique object such as Person 1, Person 2, and Car 1).

Figure 10:
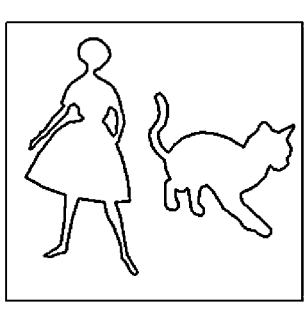
FIG. 10 is a diagram illustrating a picture sequence.
Figure 10:
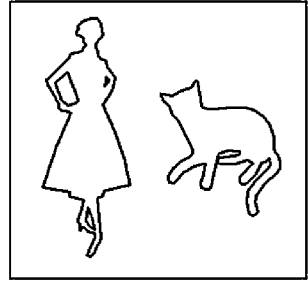
Figure 10:
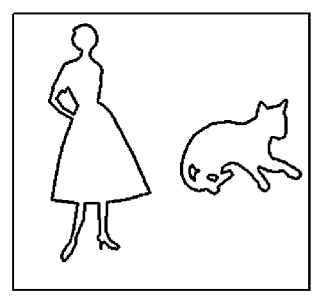
Figure 10:
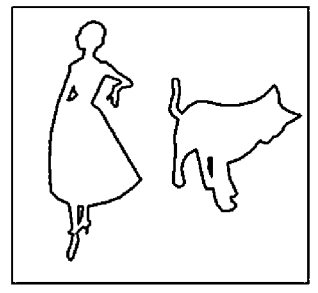
Figure 10:
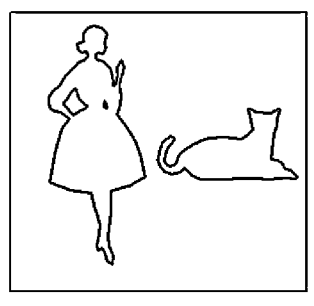
Figure 11:
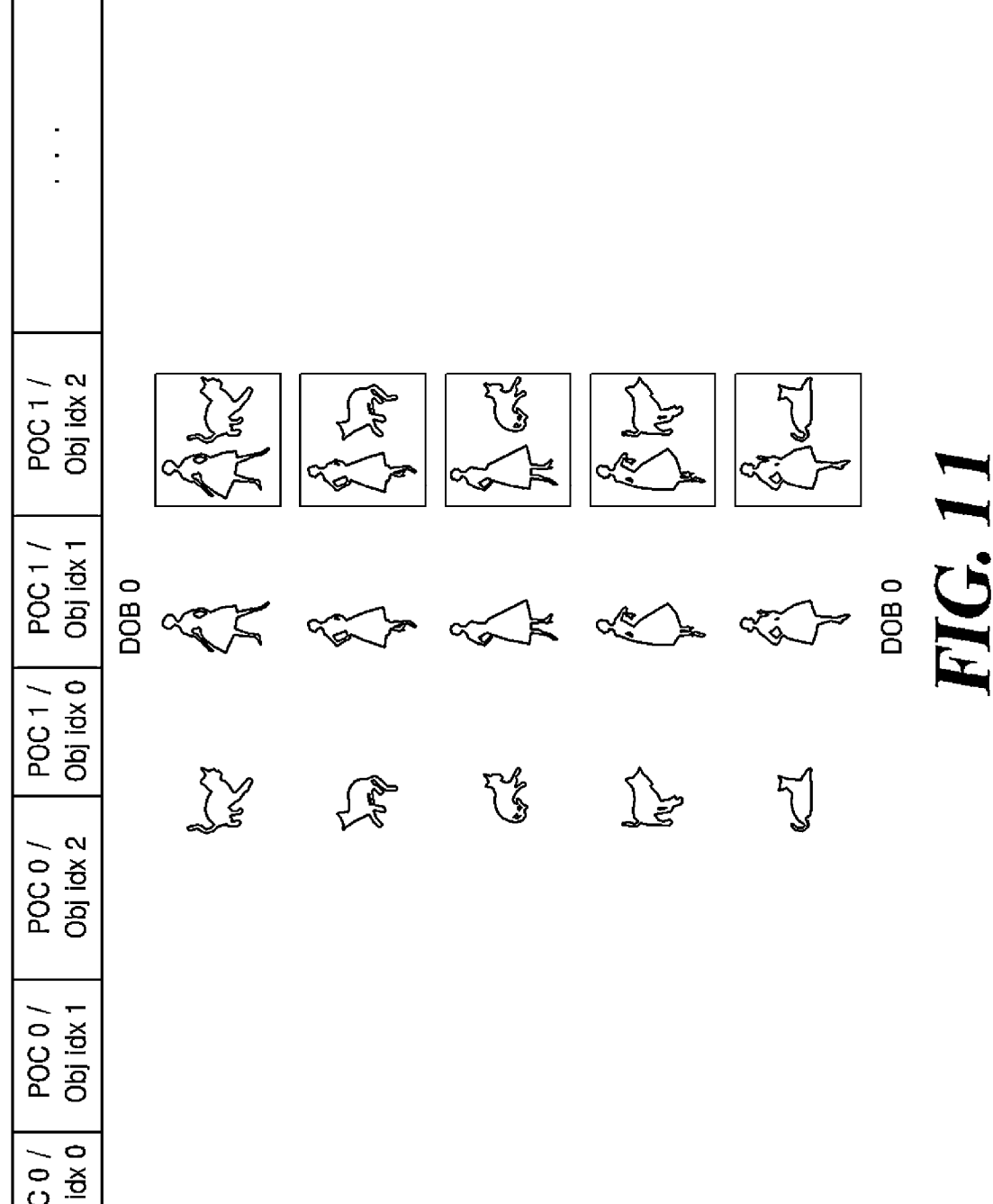
FIG. 11 is a diagram illustrating a Decoded Object Buffer (DOB) in which objects are stored according to an embodiment of the present disclosure.
Figure 12B:
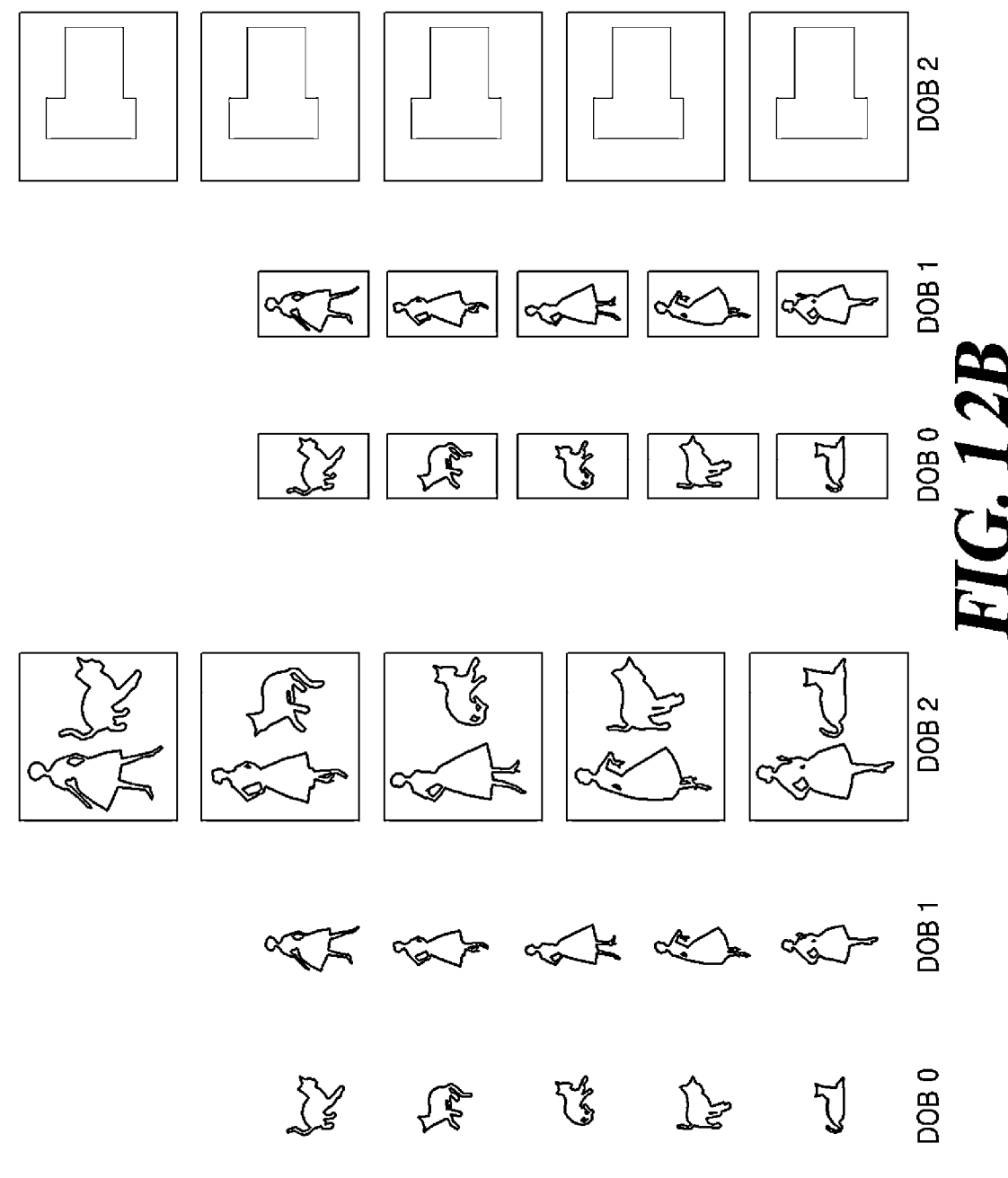

Meanwhile, a plurality of DOBs may exist, and a DOB in which restored objects are stored may be selected according to a predetermined rule. For example, for a picture sequence illustrated in FIG. 10, objects may be stored in one DOB as illustrated in FIG. 11. Alternatively, as in the illustrations of FIGS. 12A and 12B, objects may be stored in a distributed state in a plurality of DOBs, and the POC values and index values of objects stored in one DOB may be different.

Figure 13:
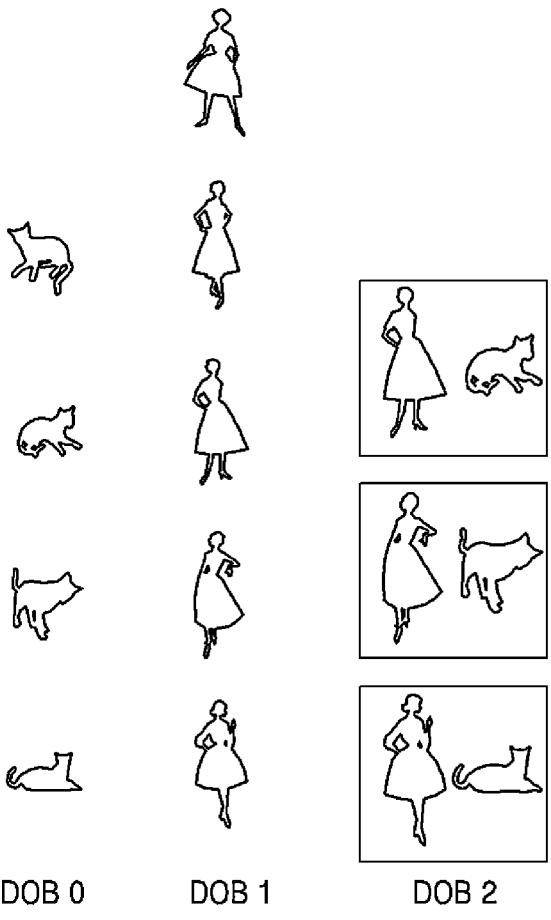
FIG. 13 is a diagram illustrating DOBs having different sizes according to an embodiment of the present disclosure.

Also, as in the illustration of FIG. 13, different DOB sizes may be used for each object category. For example, the size of the DOB may be determined according to the degree of change or motion of each object category. As in the illustration of FIG. 13, a small number of buffers may be used for object categories (background objects) with little movement, and a large number of buffers may be used for object categories (human and cat objects) with high movement.

Figure 14:
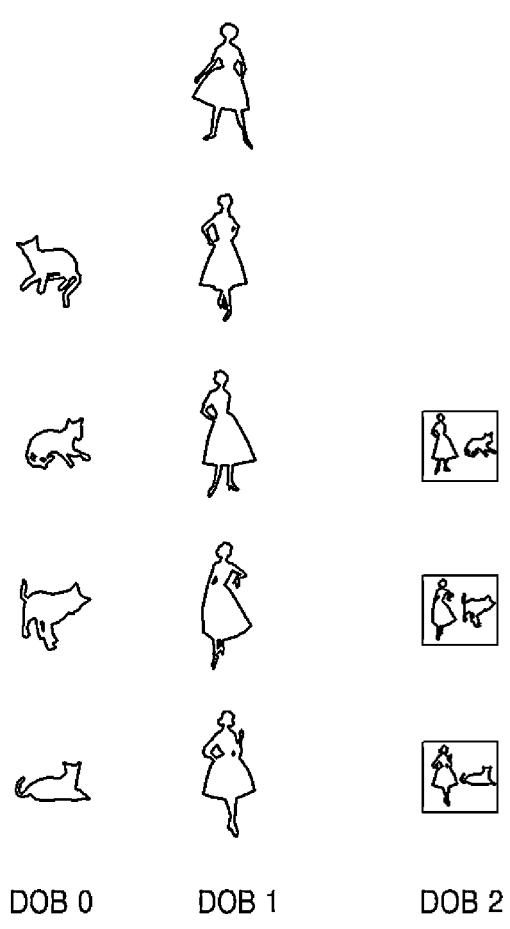
FIG. 14 is a diagram illustrating DOBs in which objects of different resolutions are stored, according to an embodiment of the present disclosure.

Also, the resolution stored in the DOB may vary for each object. When each object is stored in DOB, the resolution value may be determined depending on values, such as the degree of change or motion of each object, target bitrate, target QP, target peak signal-to-noise ratio (PSNR), just noticeable distortion (JND), and the like. In this case, the resolution value used for storage may be encoded/decoded for each object. For example, as in the illustration of FIG. 14, an object, such as a background (corresponding to DOB2) with little motion and not an ROI, may be down-sampled with a lower resolution of ½ or ¼ times and then stored in DOB. On the other hand, an object (corresponding to DOB0 and DOB1) with high importance, high movement or corresponding to the ROI may be up-sampled with a high resolution of 2 or 4 times and then may be stored in the DOB.

Hereinafter, a method for encoding/decoding syntax information related to DOB management in the case of managing DOB for each object is described with reference to the illustration of FIG. 15.

Figure 15:
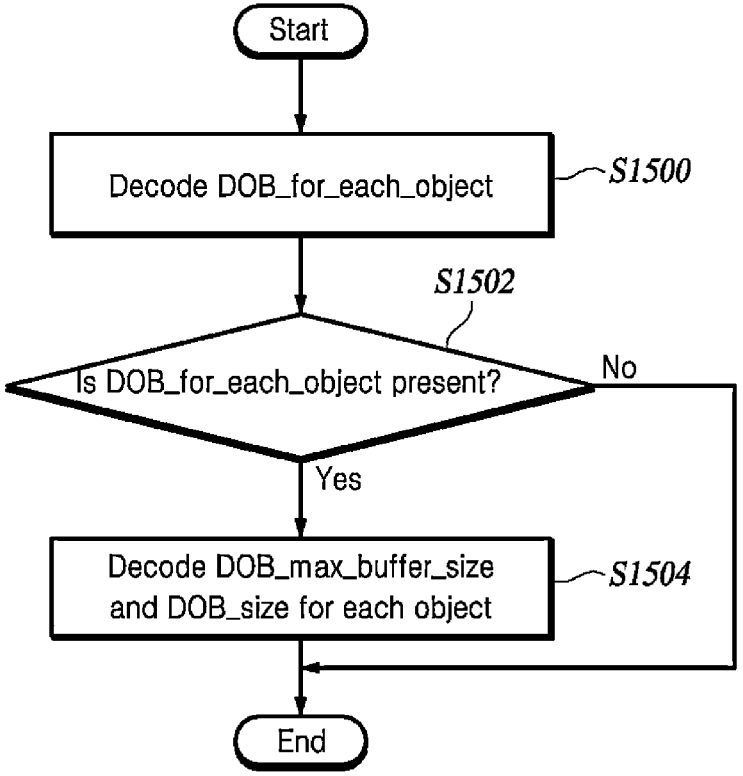
FIG. 15 is a flowchart illustrating a method for decoding syntax information related to DOB management according to an embodiment of the present disclosure.

FIG. 15 is a flowchart illustrating a method for decoding syntax information related to DOB management according to an embodiment of the present disclosure.

The video decoding apparatus decodes information (DOB_for_each_object) indicating whether DOB management for each object is performed (S1500) and then checks the corresponding information (S1502).

When the DOB is managed for each object (Yes in S1502), the video decoding apparatus decodes the maximum buffer size (DOB_max_buffer_size) and the DOB size (DOB_size) for each object (S1504). Here, the maximum buffer size represents the size of the entire number of multiple DOBs, and the DOB size represents the size of each DOB.

The illustration in FIG. 15 may also be applied to the video encoding apparatus. In this case, the video encoding apparatus obtains information indicating whether to manage DOB for each object and DOB-related information from a high level and encodes the obtained information. In addition, in the illustration in FIG. 15, the execution order of each level may be changed, omitted, or added, and the level at which each syntax is transmitted may be changed.

Meanwhile, when each object is stored in the DOB, information of a storage order (direction) may be encoded/decoded. Alternatively, the storage order may be derived using one or more pieces of information, such as the shape, type, and size of an object. The video encoding apparatus and the video decoding apparatus may sequentially store the pixel values in the restored object in the DOB according to a raster scan order or a zigzag scan order based on positions in the picture domain.

Figure 16:
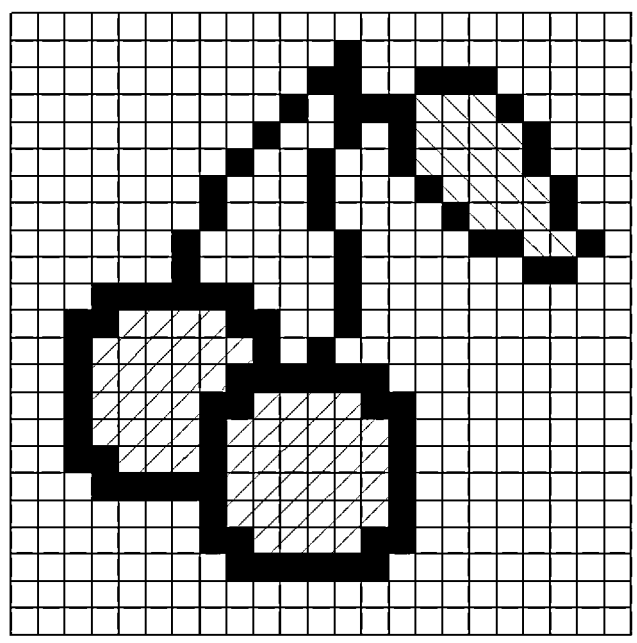
FIG. 16 is a diagram illustrating a segmentation map and objects according to an embodiment of the present disclosure.
Figure 16:
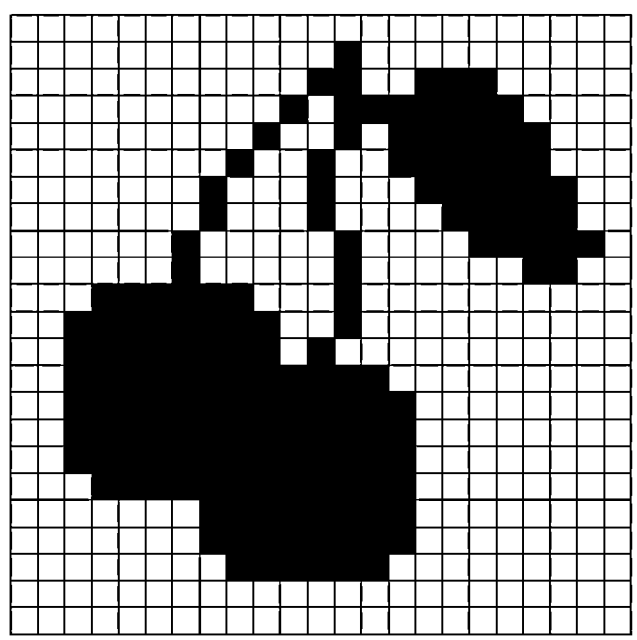
Figure 17:
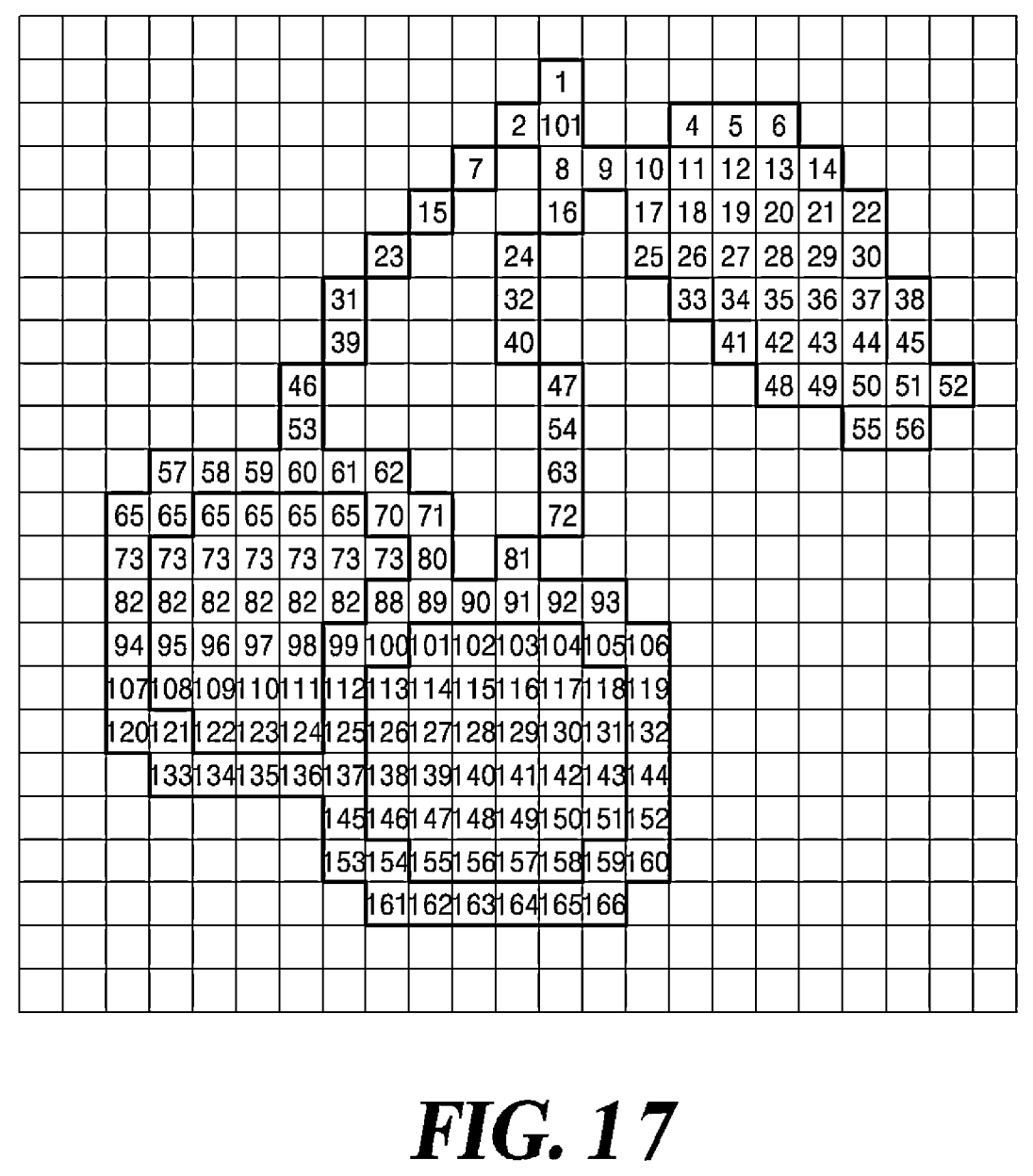

It is assumed a picture like the illustration on the top of FIG. 16, including two objects (background and cherry) according to the segmentation map like the illustration on the bottom of FIG. 16. As in the illustration of FIG. 17, the video encoding apparatus and the video decoding apparatus may sequentially store the pixels in an object in DOB according to the raster scan order. For example, in case of storing the cherry object in the DOB, the video encoding apparatus and the video decoding apparatus may store pixels 1 to 166 included in the cherry object in the DOB in ascending order, as shown in the illustration of FIG. 17. Alternatively, pixels 166 to 1 included in the cherry object may be stored in the DOB in descending order. In this case, information on the storage order (direction) may be encoded/decoded from the corresponding object header. Alternatively, as described above, the information on the storage order (direction) may be derived according to information, such as the shape, type, and size of an object.

Hereinafter, in-loop filtering of objects is described.

When encoding/decoding is performed for each object, information related to a necessary filter may be encoded/decoded. For example, when an interpolation filter is used in inter prediction, the tap size of the interpolation filter and coefficient information of the filter may be encoded/decoded or the index of a preset type of filter may be encoded/decoded according to the type of object.

In addition, when the deblocking filter is applied, information, such as the minimum size of the edge to which the deblocking filter is applied, the type of filter, the size of the filter tap, the threshold value of parameters for determining whether to perform the filter, and the clipping method, may be encoded/decoded.

In addition, when the SAO filter is applied, information, such as the type of offset to be used, the type of category to which the offset is to be applied, and the offset value (or reference value) to be applied to each category, may be encoded/decoded.

In addition, when the ALF is applied, information, such as the number of filters to be used, the size of a block for calculating a class, the shape of a filter, a clipping method, and the like, may be encoded/decoded.

In case of encoding/decoding filter-related information for each object, a method for encoding/decoding related syntax information is shown as the illustration shown in Table 1.

TABLE 1

```
Object_adaptation_parameter_set( ){
    parameter_set_id
    param_type
    if (param_type == ALF)
        ojb_alf_param( )
    if (param_type == DEBLOCK)
        ojb_deblock_param( )
    if (param_type == SAO)
        ojb_SAO_param( )
    ...
    if (param_type == FILTER_n)
        ojb_fil_n_param( )
}
```

Here, FILTER_n is an identifier representing an arbitrary filter not mentioned above.

The encoding/decoding order of each syntax element shown in Table 1 may be changed, omitted, or added, and the transmission level of each syntax element may be changed.

Hereinafter, a method for encoding/decoding syntax information related to filter management in the case of managing filters for each object is described with reference to the illustration of FIG. 18.

Figure 18:
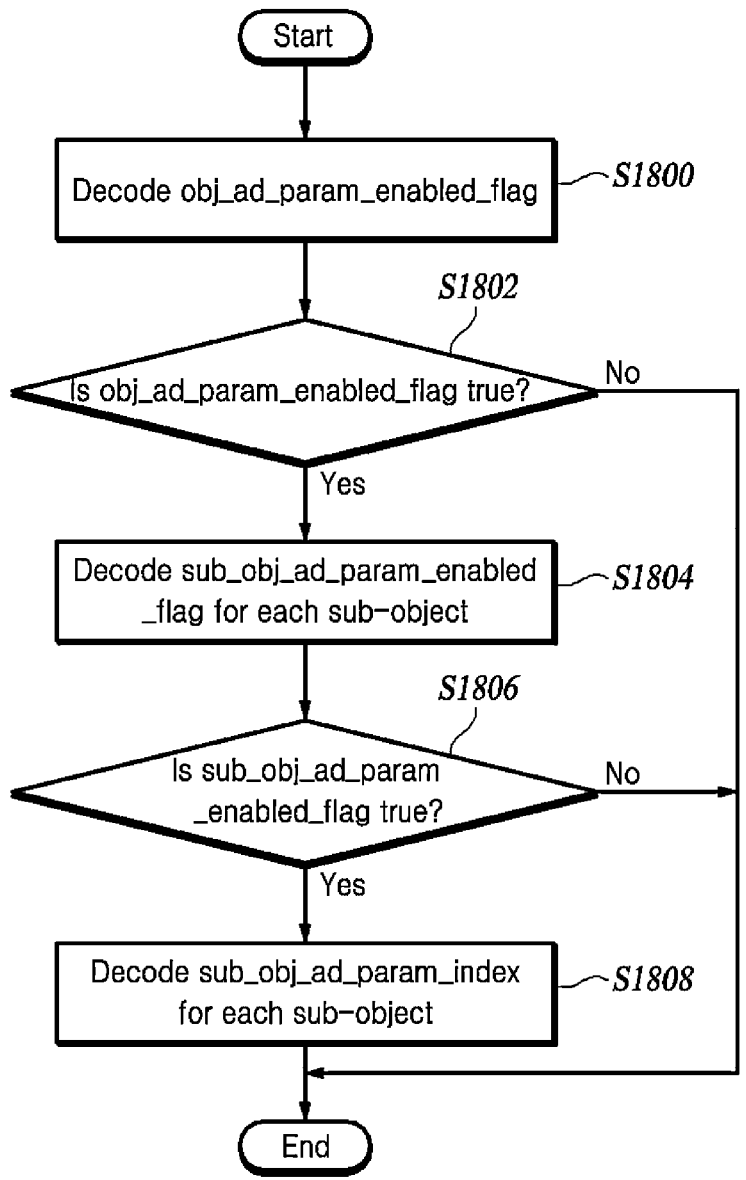
FIG. 18 is a flowchart illustrating a method for decoding filter-related syntax information according to an embodiment of the present disclosure.

FIG. 18 is a flowchart illustrating a method for decoding filter-related syntax information according to an embodiment of the present disclosure.

The video decoding apparatus decodes the flag obj_ad_param_enabled_flag indicating whether filter parameter management is activated for each object (S1800), and then the video decoding apparatus checks the flag (S1802).

When the corresponding flag is activated (Yes in S1802), the video decoding apparatus decodes a flag sub_obj_ad_param_enabled_flag indicating whether to use a filter parameter for each sub-object of each object (S1804). Then the video decoding apparatus checks the corresponding flag (S1806).

When a corresponding flag is activated so that each sub-object uses a filter parameter (Yes in S1806), the video decoding apparatus decodes an index indicating a parameter set.

The illustration of FIG. 18 may also be applied to the video encoding apparatus. In this case, the video encoding apparatus obtains information for corresponding flags and parameter set from a high level and encodes the obtained information. In addition, in the illustration of FIG. 18, the execution order of each level may be changed, omitted, or added, and the level at which each syntax is transmitted may be changed.

In addition, the video encoding apparatus and the video decoding apparatus may additionally adjust filter parameter values for blocks, which are basic units, in the process of encoding/decoding.

Hereinafter, a picture in which objects are combined is described.

After a plurality of restored objects stored in the DOB is reconstituted into one picture, the reconstituted picture may be stored in the DPB 630 or 730. In the reconstitution process, the restored objects may be reconstituted at corresponding positions using the position information of each object in the picture, which is stored in the DOB header. In the reconstitution process, blending is performed on an overlapping region of two or more objects to determine final values of pixels in the corresponding area. The blending may be performed per pixel basis within the overlapping area based on the segmentation map.

First, after an object having the largest number of pixels with the same segmentation instance index in an overlapping area of a plurality of objects is selected, a value of each pixel of the corresponding object may be determined as a blended value. Alternatively, a weighted summation value of pixel values of each object for each overlap pixel in the overlapping area may be generated as a blended value of the corresponding pixel.

Figure 19:
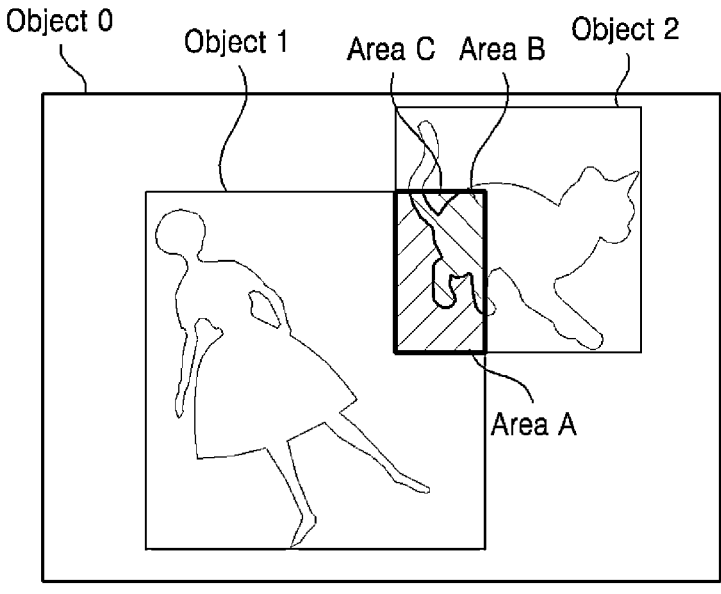
FIG. 19 is a diagram illustrating an overlapping area between rectangular objects according to an embodiment of the present disclosure.

FIG. 19 is a diagram illustrating an overlapping area between rectangular objects according to an embodiment of the present disclosure.

Alternatively, as illustrated in FIG. 19, some of the boundaries of segmentation instances in an overlapping area of a plurality of objects may be used as a blending boundary. First, for an area having the same segmentation instance index in the overlapping area, an object that is closest to this area and includes a pixel (or pixels) having the same index as that of this area is selected. For example, since Area A in the illustration of FIG. 19 is included in Instance 0 according to the illustration of FIG. 8A, an object that is closest to this area and includes a pixel (or pixels) having the same index as that of this area is Object 1. Also, Object 2 may be selected for Area B and Area C. Thereafter, each pixel value of the corresponding object for each area may be determined as a final blended value.

Figure 20:
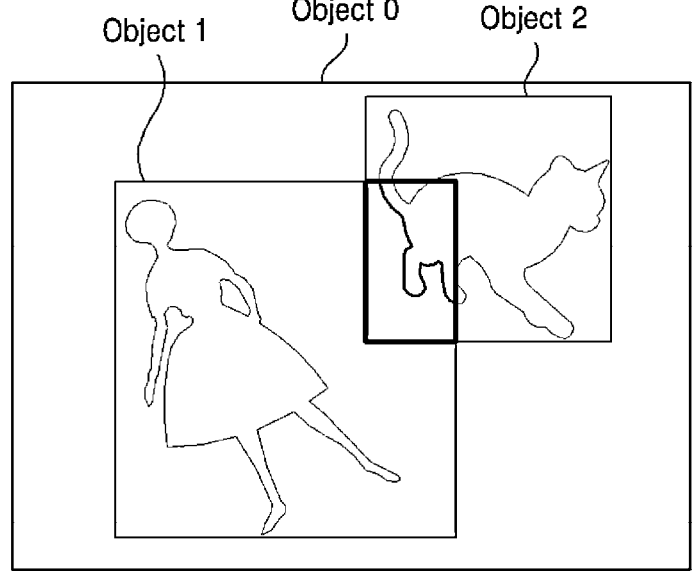
FIG. 20 is a diagram illustrating classification of boundaries between objects according to an embodiment of the present disclosure.

FIG. 20 is a diagram illustrating classification of boundaries between objects according to an embodiment of the present disclosure.

Meanwhile, after reconstituting a plurality of objects into one picture, filtering may be performed at a boundary between objects. According to the classification of boundaries between objects illustrated in FIG. 20, filtering for each boundary may be performed as follows. When a boundary is between objects and between non-overlapping areas, filtering may be performed on pixels around the corresponding boundary. When a boundary is between the objects, is a boundary of an area overlapping between objects, and pixels around the corresponding boundary are included in the same object, the filtering may not be performed. When the boundary is within an area overlapping between objects and pixels around the corresponding boundary are included in different segmentation instances (e.g., a blending boundary), the filtering may not be performed.

Hereinafter, a method for encoding objects by a video encoding apparatus and a method for decoding objects by a video decoding apparatus are described with reference to the illustrations of FIGS. 21 and 22.

Figure 21:
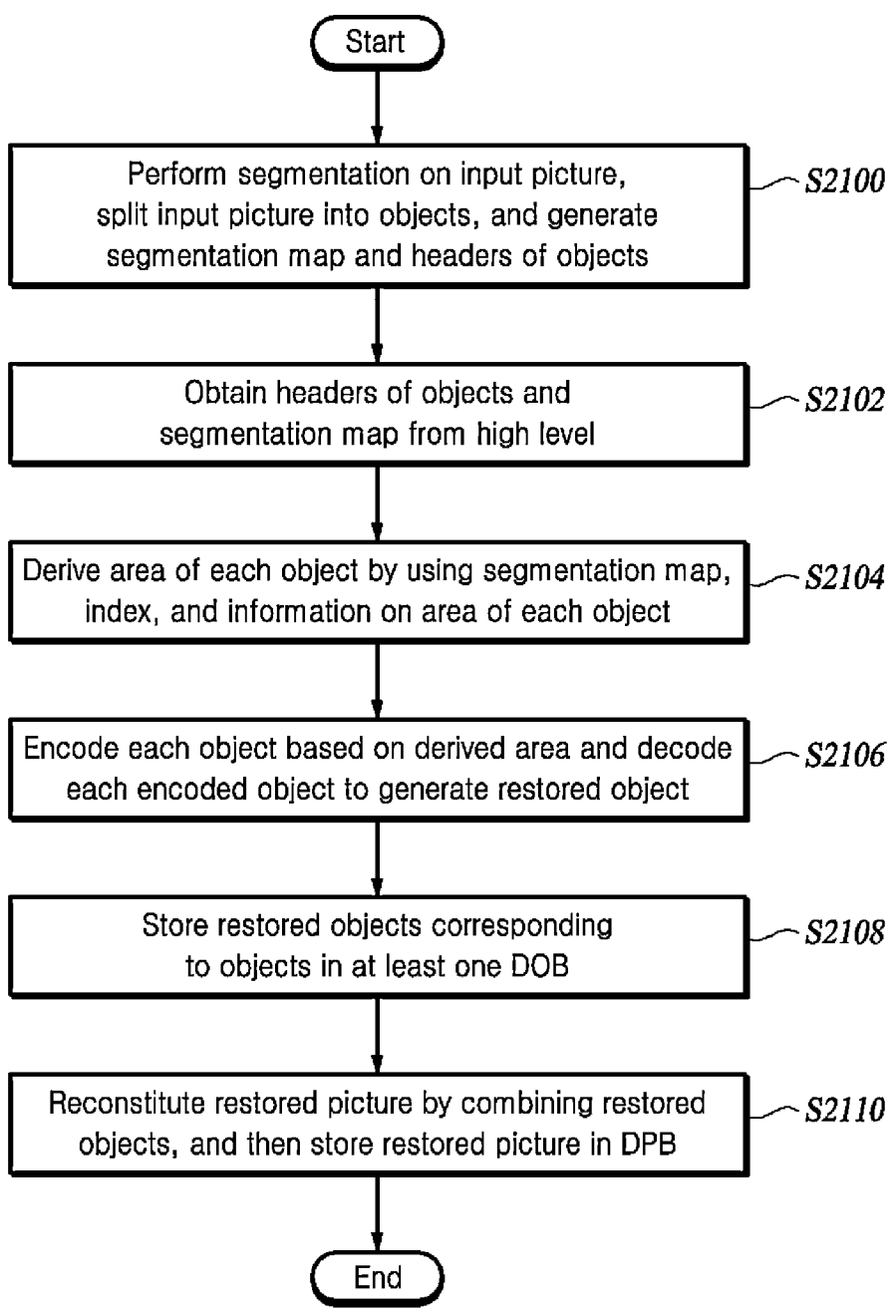
FIG. 21 is a flowchart illustrating a method for encoding objects by a video encoding apparatus according to an embodiment of the present disclosure.

FIG. 21 is a flowchart illustrating a method for encoding objects by a video encoding apparatus according to an embodiment of the present disclosure.

The video encoding apparatus performs segmentation on the input picture, splits the input picture into objects, and generates a segmentation map and headers of the objects (S2100).

The segmentation map may be an instance index map perf pixel basis when a picture is split into one or multiple instances. Each object may be a set of pixels having the same instance index in the segmentation map. After encoding the segmentation map and the headers of the objects, the video encoding apparatus may transmit the encoded segmentation map and the encoded headers of the objects to the video decoding apparatus.

The video encoding apparatus obtains the headers of objects and a segmentation map from a high level (S2102).

Here, the object header of each object includes the index of each object and information on the area of each object. In addition, the header of each object may include all or some of the type of each object, the importance of each object, prediction methods, transformation methods, types of prediction modes, range and position of reference samples, size of DPB, basic quantization parameters, and/or basic motion parameters.

The video encoding apparatus derives the area of each object by using the segmentation map, the index, and the information on the area of each object (S2104).

Each object may be an area of an arbitrary shape according to information on the area of each object or a rectangular area including an area of an arbitrary shape. When each object has a rectangular area, the video encoding apparatus may split each object into coding blocks, starting from the top left coordinate of each object. Thereafter, the video encoding apparatus may split each coding block into prediction units and may perform prediction for each prediction unit. Alternatively, when each object is an area having an arbitrary shape, the video encoding apparatus may use each object as a prediction unit.

Meanwhile, when an object does not exist in a picture or slice, the video encoding apparatus may split the picture or slice into coding blocks starting from the top left coordinate of the picture or slice. Here, each coding block may be a CTU or CU. Thereafter, the video encoding apparatus may split each coding block into prediction units and may perform prediction for each prediction unit.

The video encoding apparatus encodes each object based on the derived area and decodes each encoded object to generate a restored object (S2106).

Since the processes of encoding each object and generating a restored object by the video encoding apparatus have already been described, additional description thereof is omitted.

However, in the case of encoding using synthesis, the video encoding apparatus obtains a flag indicating synthesis from a high level and then obtains object description information for synthesis from a higher level when the flag is true. After generating a pattern based on the object description information, the video encoding apparatus may synthesize a restored object using the generated pattern. The video encoding apparatus may encode the flag indicating synthesis and the object description information and then may transmit the encoded flag and object description information to the video decoding apparatus.

The video encoding apparatus stores the restored objects corresponding to the objects in at least one DOB (S2108). Here, each DOB includes a DOB header.

The header of each DOB may include all or some of the number of restored objects stored in the DOB, the POC of the picture including each restored object, the index of each restored object in the picture, the position of each object in the picture, and/or the number of pixels of each restored.

The video encoding apparatus reconstitutes the restored picture by combining the restored objects and then stores the restored picture in a DPB (S2110).

Since the processes of storing the restored objects in the DOB and storing the restored picture in the DPB by the video encoding apparatus have already been described, additional description is omitted.

Figure 22:
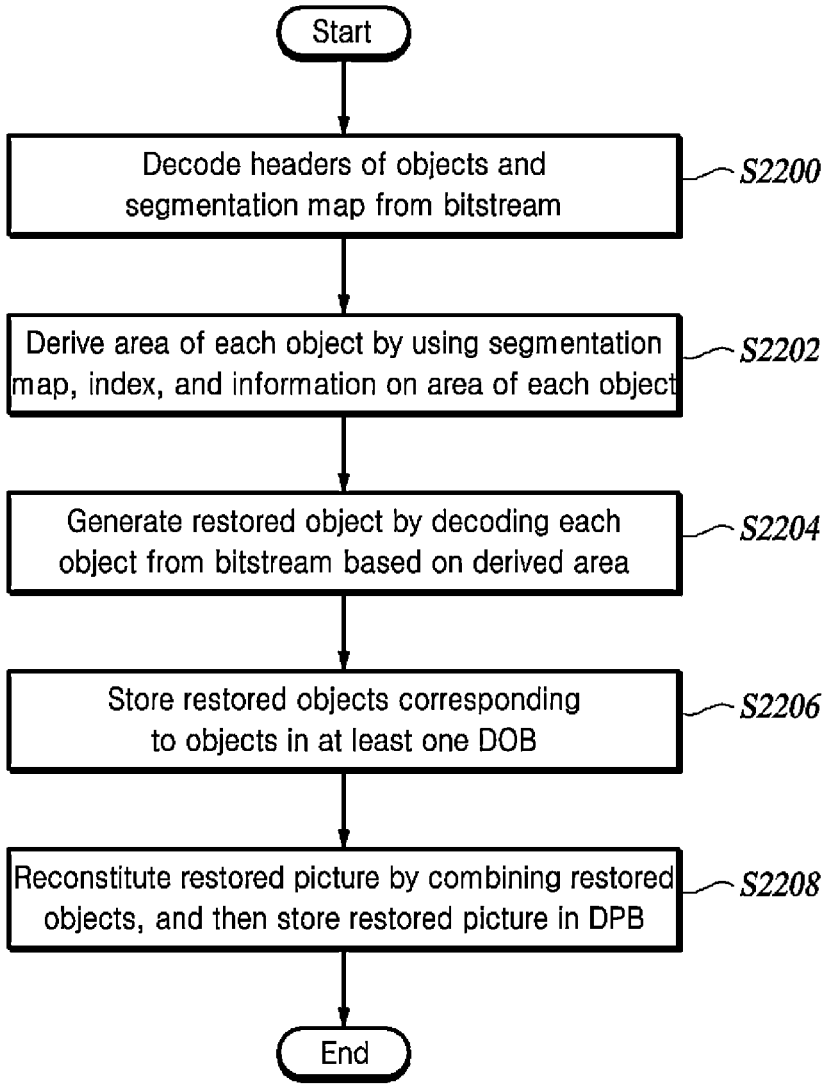
FIG. 22 is a flowchart illustrating a method for decoding objects by a video decoding apparatus according to an embodiment of the present disclosure.

FIG. 22 is a flowchart illustrating a method for decoding objects by a video decoding apparatus according to an embodiment of the present disclosure.

The video decoding apparatus decodes headers of objects and a segmentation map from the bitstream (S2200). Here, the header of each object includes an index of each object and information on an area of each object.

Meanwhile, the segmentation map may be generated and encoded by the video encoding apparatus and transmitted to the video decoding apparatus. The segmentation map may be an instance index map per pixel basis when a picture is split into one or multiple instances. Each object may be a set of pixels having the same instance index in the segmentation map.

The video decoding apparatus derives the area of each object by using the segmentation map, the index, and the information on the area of each object (S2202).

The video decoding apparatus generates the restored object by decoding each object from the bitstream based on the derived area (S2204).

Since the process of generating the restored object by the video decoding apparatus has already been described, additional description is omitted.

However, in the case of decoding using synthesis, the video decoding apparatus decodes a flag indicating synthesis from the bitstream and then, when the flag is true, decodes object description information for synthesis from the bitstream. After generating a pattern based on object description information, the video decoding apparatus may synthesize the restored object using the generated pattern.

The video decoding apparatus stores the restored objects corresponding to the objects in at least one DOB (S2206). Here, each DOB includes a DOB header.

The video decoding apparatus reconstitutes the restored picture by combining the restored objects, and then stores the restored picture in the DPB (S2208).

Since the processes of storing the restored objects in the DOB and storing the restored picture in the DPB by the video decoding apparatus have already been described, additional description is omitted.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

604: segmentation operator
610: object coder
620: decoded object buffer (DOB)
630: decoded picture buffer (DPB)
710: object decoder
720: DOB
730: DPB

What is claimed is:

1. A method for decoding a current picture performed by a video decoding apparatus, the method comprising:

decoding object header information and a segmentation map for the current picture from a bitstream, wherein the object header information includes an index of each of objects and a type of each of the objects which is a background object type or a non-background object type, and wherein the segmentation map specifies an instance index assigned for each pixel within the current picture;

deriving, within the current picture, an object area of each of the objects by using the segmentation map and the index; and generating restored objects by decoding the object area of each of the objects from the bitstream;

wherein when a target object to be restored is the non-background object type, decoding the object area of the target object comprises:

decoding values of pixels within the object area of the target object from the bitstream, and wherein when a target object to be restored is the background object type, decoding the object area of the target object comprises:

decoding object description information describing a pattern of an object from the bitstream, wherein the object description information includes information for specifying at least one of a color, a size, or a shape of the pattern; and synthesizing values of pixels within the object area of the target object using the pattern described in the object description information, without the decoding values of the pixels within the object area of the target object from the bitstream.

2. The method of claim 1, wherein the object header information further includes all or some of an importance of each of the objects, prediction methods, transformation methods, a type of prediction modes, range and position of reference samples, a size of a decoded picture buffer (DPB), a basic quantization parameter, and a basic motion parameter.

3. The method of claim 1, wherein the object header information further includes information for indicating a shape for the object area of each of the objects, and wherein the object area of each of the objects is set as either an area of an arbitrary shape, which is formed by a set of pixels, within the current picture, assigned a same instance index in the segmentation map, or a rectangular area surrounding the area of the arbitrary shape within the current picture, depending on information for indicating the shape.

4. The method of claim 3, wherein decoding the object area of each of the objects includes:

splitting the object area of each of the objects into coding blocks starting from a top left coordinate of the object area of each of the objects when the object area of each of the objects is set as the rectangular area, and using the object area of each of the objects as a prediction unit when the object area of each of the objects is the area of the arbitrary shape.

5. The method of claim 2, wherein generating the restored objects includes:

fixing the prediction methods, limiting number of intra prediction modes for intra prediction, or limiting a type of inter prediction modes or range of motion vector, based on the type of each of the objects.

6. The method of claim 2, wherein generating the restored objects includes:

using samples existing in each of the objects as the reference samples when performing intra prediction of each of the objects.

7. The method of claim 1, further comprising:

storing the restored objects corresponding to the objects in at least one decoded object buffer (DOB), wherein each DOB of the at least one DOB includes a DOB header, wherein the DOB header includes all or some of a number of restored objects stored in the at least one DOB, a picture order count (POC) of a picture including each of the restored objects, an index of each of the restored objects in the picture, a position of each object in the picture, and a number of pixels of each of the restored objects.

8. The method of claim 7, wherein storing in the at least one DOB includes:

selecting the DOB in which each restored object is stored according to a predetermined rule in case of using multiple decoded object buffers (DOBs).

9. The method of claim 7, wherein storing in the at least one DOB includes:

determining a size of each DOB based on a degree of change or motion of a category in which each of the objects is included in case of using multiple DOBs.

10. The method of claim 7, wherein storing in the at least one DOB includes:

determining a resolution of each of the objects based on a degree of change, a degree of motion, and an importance of each of the objects when storing in each DOB in case of using multiple DOBs.

11. The method of claim 7, further comprising:

reconstituting the object areas of the restored objects based on the position of each of the objects in the current picture when the object area of each of the objects is set as a rectangular area; and performing blending on an overlapping area of two or more objects.

12. The method of claim 1, further comprising:

generating a restored picture for the current picture by combining the object areas of the restored objects when the object area of each of the objects is the area of an arbitrary shape; and for an object boundary in the restored picture, performing filtering on pixels around the object boundary when the object boundary is a boundary between non-overlapping objects in the restored picture.

13. A method for encoding a current picture performed by a video encoding apparatus, the method comprising:

generating a segmentation map for the current picture and identifying an object area of each of objects within the current picture, wherein the segmentation map specifies an instance index assigned for each pixel within the current picture;

encoding object header information and the segmentation map, wherein the object header information includes an index of each of the objects and a type of each of the objects which is a background object type or a non-background object type; and encoding the object area of each of the objects, wherein when a target object to be encoded is the non-background object type, encoding the object area of each of the objects comprises:

encoding values of pixels within the object area of the target object into a bitstream, and wherein when a target object to be encoded is the background object type, encoding the object area of each of the objects comprises:

encoding, into the bitstream, object description information describing a pattern of an object to be used for synthesizing values of pixels within the object area of the target object, without encoding the values of pixels for the object area of the target object, and wherein the object description information includes information for specifying at least one of a color, a size, or a shape of the pattern.

14. A method for providing a video decoding apparatus with a bitstream, the method comprising:

encoding a current picture into the bitstream;

transmitting the bitstream to the video decoding apparatus, wherein encoding the current picture comprises:

generating a segmentation map for the current picture and identifying an object area of each of objects within the current picture, wherein the segmentation map specifies an instance index assigned for each pixel within the current picture;

encoding object header information and the segmentation map, wherein the object header information includes an index of each of the objects and a type of each of the objects which is a background object type or a non-background object type; and encoding the object area of each of the objects, wherein when a target object to be encoded is the non-background object type, encoding the object area of the target object comprises:

encoding values of pixels within the object area of the target object into a bitstream, and wherein when a target object to be encoded is the background object type, encoding the object area of the target object comprises:

encoding, into the bitstream, object description information describing a pattern of an object to be used for synthesizing values of pixels within the object area of the target object, without encoding the values of pixels for the object area of the target object, and wherein the object description information includes information for specifying at least one of a color, a size or shape of the pattern.

* * * * *